United States Patent

Rim

Patent Number: 5,623,320
Date of Patent: Apr. 22, 1997

[54] GHOST PREVENTION APPARATUS FOR TELEVISION

[75] Inventor: Seong S. Rim, Kyungsangbook-Do, Rep. of Korea

[73] Assignee: LG Electronics Inc., Rep. of Korea

[21] Appl. No.: 564,390

[22] Filed: Nov. 29, 1995

[30] Foreign Application Priority Data

Nov. 30, 1994 [KR] Rep. of Korea .................. 31931-1994

[51] Int. Cl.⁶ .................................................... H04N 5/21
[52] U.S. Cl. ............................................ 348/614; 348/607
[58] Field of Search .................................. 348/614, 607; 358/32, 167, 905; H04N 5/21, 5/213

[56] References Cited

U.S. PATENT DOCUMENTS

| | | | |
|---|---|---|---|
| 4,364,093 | 12/1982 | Holmes | 348/614 |
| 4,374,400 | 2/1983 | Holmes | 348/614 |
| 5,311,315 | 5/1994 | Sakata | 348/614 |
| 5,389,977 | 2/1995 | Lee | 348/614 |

*Primary Examiner*—John K. Peng
*Assistant Examiner*—Chris Grant
*Attorney, Agent, or Firm*—Ostrolenk, Faber, Gerb & Soffen, LLP

[57] ABSTRACT

An improved ghost prevention apparatus for a television capable of preventing ghost of a picture of a television, which occurs due to a detection wave distortion, by generating a key pulse within a part of a horizontal synchronous section of a timing signal generator, by turning on an automatic phase controller for the key pulse generation section and turning off the same for the remaining horizontal synchronous, which includes a synchronous separator for separating horizontal and vertical synchronous signals, respectively, from a combined picture signal detected by a picture wave detector; a timing signal generator for generating a key pulse in a horizontal synchronous range in accordance with a horizontal synchronous signal outputted from the synchronous separator and for generating a vertical blanking signal in a vertical synchronous range in accordance with a vertical synchronous signal; a first sampling holder for sample-holding a phase control signal outputted from the picture wave detector, outputting the thusly sample-holden phase control signal to the picture wave detector in accordance with a key pulse outputted from the timing signal generator, and enabling the picture wave detector; and a second sampling holder for sample-holding an AGC wave detection signal outputted from an AGC circuit, disabling the AGC circuit in accordance with a vertical blanking signal outputted from the timing signal generator.

1 Claim, 8 Drawing Sheets

GHOST PREVENTION APPARATUS FOR TELEVISION

BACKGROUND OF THE INVENTION

1. Field of the Invention

The present invention relates to a ghost prevention apparatus for television, and in particular to an improved ghost prevention apparatus capable of preventing ghost of a television picture, which occurs due to a distortion of a wave detection, by generating a key pulse within a horizontal synchronous section of a timing signal generator, by turning on an automatic phase controller for the key pulse generation section and turning off the same for the remaining horizontal synchronous section, and by delaying a response time.

2. Description of the Conventional Art

Figure 1:
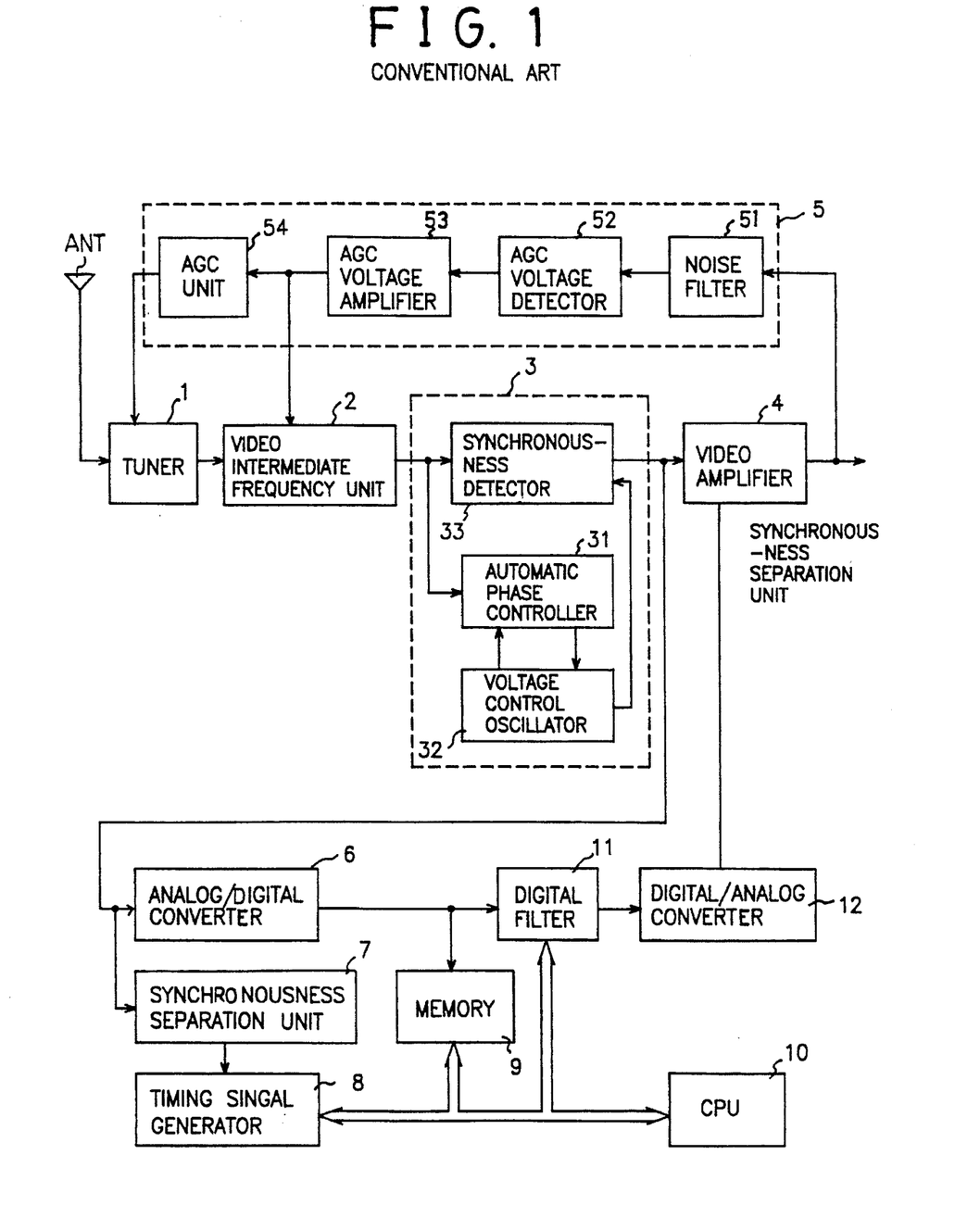
FIG. 1 is a block diagram of a ghost prevention apparatus for a conventional television.

Referring to FIG. 1, the conventional ghost prevention apparatus for a television includes a tuner 1 for selecting a desired broadcasting signal of a television signal transmitted thereto through an antenna ANT and for outputting a picture intermediate frequency signal, a picture intermediate frequency amplifier 2 for amplifying a picture intermediate frequency signal outputted from the tuner 1 to a predetermined level, a picture wave detector 3 for synchronous-detecting a picture intermediate frequency signal amplified by the picture intermediate frequency amplifier 2 and for outputting a combined picture signal, a picture amplifier 4 for amplifying a combined picture signal outputted from the picture wave detector 3 to a predetermined level, an AGC (auto gain control) circuit 5 for detecting an AGC voltage in accordance with a synchronous signal of the combined picture signal amplified by the picture amplifier 4 and for automatically controlling the gain of the tuner 1 and the picture intermediate frequency amplifier 2, an analog/digital signal convertor 6 for converting the combined picture signal detected by the picture wave detector 3 into a digital signal, a synchronous separator 7 for vertical synchronous and horizontal synchronous signals from the combined picture signal detected by the picture detector 3, a timing signal generator 8 for generating a timing signal in accordance with vertical and horizontal synchronous signals separated by the synchronous separator 7, a GCR memory 9 for storing a ghost canceler reference (hereinafter called a "GCR") of a digital data converted by the analog/digital signal convertor in accordance with a timing signal generated by the timing signal generator 8, a central processing unit 10 for receiving a GCR data stored in the GCR memory 9 in accordance with a timing signal outputted from the timing signal generator 8 and for comparing the thusly received signal with the GCR data and for outputting a certain filter coefficient in accordance with a result of the comparison, a digital filter 11 for removing a ghost component from the digital signal converted by the analog/digital signal convertor 6 in accordance with filter coefficient outputted from the central processing unit 10, and a digital/analog signal convertor 12 for converting the digital signal in which the ghost component is removed by the digital filter 11 into an analog signal.

In addition, the picture wave detector 3 includes an automatic phase controller 31 for comparing the phase of a picture intermediate frequency signal outputted from the picture intermediate frequency amplifier 2 with the phase of an oscillating frequency so that the above two phases should be matched and for outputting a phase control signal corresponding to the matched phase, a voltage control oscillator 32 which is oscillated in accordance with a phase control signal outputted from the automatic phase controller 31 for outputting a switching signal which is an oscillating signal, and a synchronous wave detector 33 for detecting the picture intermediate frequency signal outputted from the picture intermediate frequency amplifier 2 in accordance with a switching signal outputted from the voltage control oscillator 32 and for outputting a combined picture signal.

Figure 2:
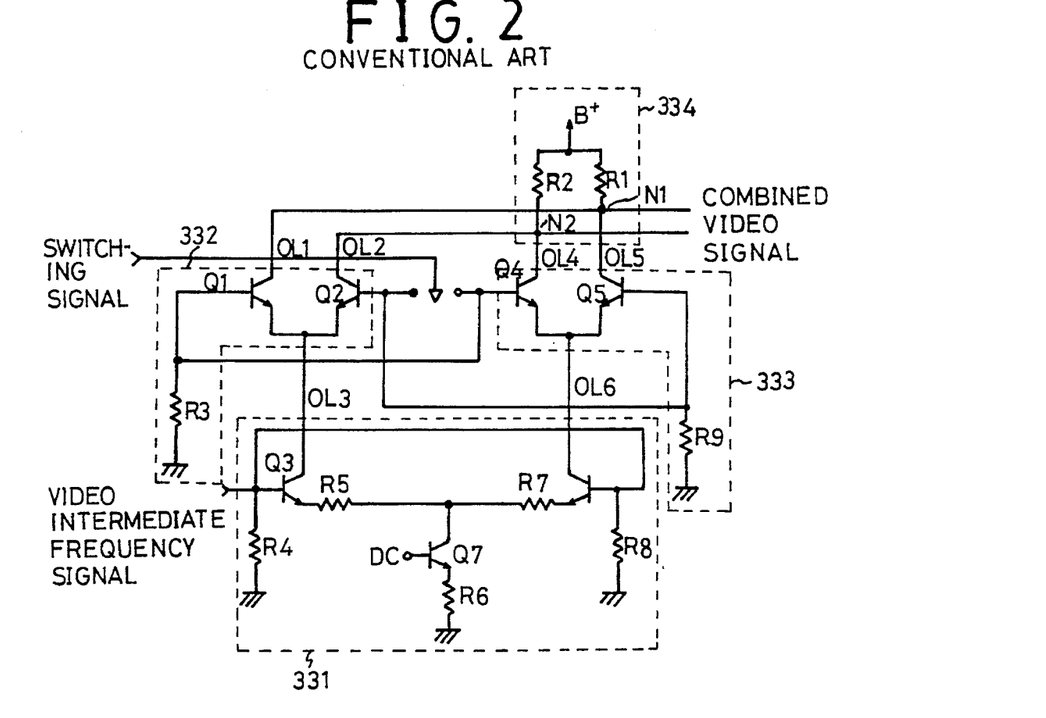
FIG. 2 is a circuit view of a synchronous wave detector of FIG. 1.

In addition, referring to FIG. 2, the synchronous wave detector 33 includes a differential amplifier 331 for differentially amplifying the picture intermediate frequency signal outputted from the picture intermediate frequency amplifier 2 and for outputting the thusly differentially amplified signal to a corresponding element through signal output lines OL3 and OL6, a first switch 332 switched in accordance with a switching signal outputted from the voltage control oscillator 32 for outputting the signal outputted from the differential amplifier 331 through the output line OL3 to a corresponding element through output lines OL1 and Ol2, a second switch 333 switched in accordance with a switching signal outputted from the voltage control oscillator 32 and for outputting the signal outputted from the differential amplifier 331 through an output line OL6 to a corresponding element through output lines OL4 and OL5, and a signal adder 334 for adding the signals outputted from the first and second switches 332 and 333 and for outputting the thusly added signals to a corresponding element.

The differential amplifier 331 includes a transistor Q3 having a collector terminal connected to an output line OL3, a base terminal connected to an output line of the picture intermediate frequency amplifier 2, and an emitter terminal connected to a resistance R5, a transistor Q6 having a collector terminal connected to an output line OL6, a base terminal connected to the base terminal of the transistor Q3, and a drain terminal connected to a resistance R7, and a transistor Q7 having a collector terminal commonly connected to resistances R5 and R6, a base terminal connected to an input line of an external direct current voltage DC, and a drain terminal connected to the resistance R6 and a ground voltage in order.

The first switch 332 includes transistors Q1 and Q2 having collected terminals connected to the output lines OL1 and OL2, base terminals commonly connected an output line of the voltage control oscillator 32, and drain terminals commonly connected to the output line OL3 of the differential amplifier 331, and transistors Q4 and Q5 having collector terminals connected to the output lines OL4 and OL5, base terminals connected to the base terminals of the transistors Q1 and Q2, and drain terminals commonly connected to the output line OL6 of the differential amplifier 331.

The signal adder 334 includes a resistance R1 having one end connected to an input line of an external input voltage $B^+$ and the other end connected to a node N1 between the output line OL1 of the first switch 332 and the output line OL5 of the second switch 333, and a resistance R2 having one end connected to the external input terminal $B^+$ and the other end connected to a node N2 between the output line OL2 of the first switch 332 and the output line OL4 of the second switch 333.

The AGC unit 5 includes a noise removing unit 51 for removing noise from the combined picture signal outputted from the picture amplifier 4, an AGC voltage wave detector 52 for detecting an AGC voltage from the combined picture signal outputted from the noise removing unit 51, an AGC voltage amplifier 53 for amplifying the AGC voltage outputted from the AGC voltage wave detector 52 to a predetermined level and for controlling a gain of the picture intermediate frequency amplifier 2, and an AGC unit 54 for controlling a gain of the tuner 1 in accordance with an AGC voltage outputted from the AGC voltage amplifier 53.

Figure 3:
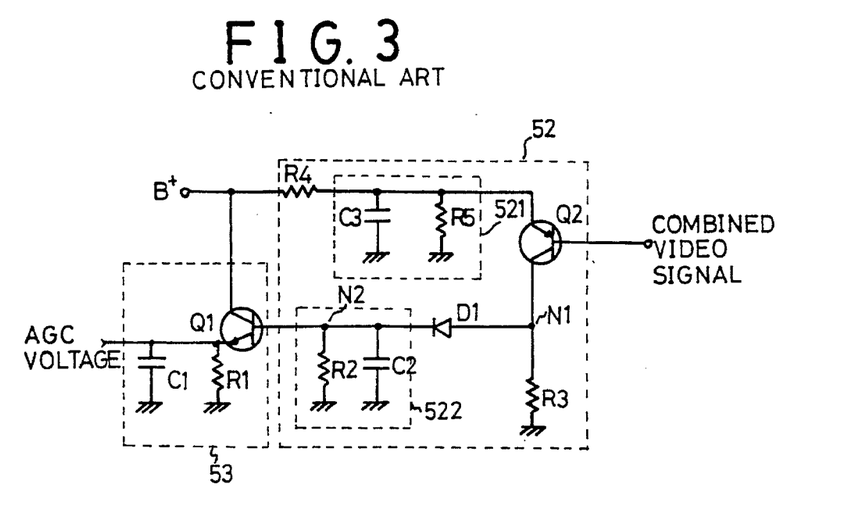
FIG. 3 is a circuit diagram of an AGC circuit of FIG. 3.

In addition, referring to FIG. 3, the AGC voltage wave detector 52 includes a charging/discharging voltage wave detector 521 having a condenser C3 and a resistance R5 for charging/discharging an external input voltage $B^+$ transmitted through the resistance R4, a transistor Q2 switched in accordance with a combined picture signal outputted from the noise removing unit 51 for outputting a certain voltage charged to the charging/discharging unit 521, a wave detection diode D1 for detecting a voltage outputted from the transistor Q2, and a charging/discharging unit 522 having a condenser C2 and a resistance R2 for charging/discharging the voltage detected by the wave detection diode D1.

The AGC voltage amplifier 53 includes a transistor Q1 for amplifying the voltage discharged by the charging/discharging unit 522 of the AGC voltage wave detector 52, and a smoothing circuit including a resistance R1 and a condenser C1 for smoothing and outputting the voltage amplified by the transistor Q1.

The operation of a ghost prevention apparatus for a conventional television will now be explained with reference to FIGS. 4 through 9.

To begin with, when the tuner 1 receives a certain broadcasting signal transmitted from a certain broadcasting station through the antenna ANT, the tuner 1 outputs an intermediate frequency signal, and the thusly outputted intermediate frequency signal is amplified by the picture intermediate frequency amplifier 2 to a predetermined level.

Thereafter, the automatic phase controller 31 of the picture wave detector 3 receives a picture intermediate frequency signal outputted from the picture amplifying frequency amplifier 2 and an oscillating signal from the voltage control oscillator 32 and compares the phases of the picture intermediate frequency signal and the oscillating signal and outputs a phase control signal so as to match the phase of the picture intermediate frequency signal and the phase of the oscillating signal in accordance with a result of the comparison.

The voltage control oscillator 32 receives the phase control signal outputted from the phase controller 31 and outputs a switching signal, which is an oscillating signal, in accordance with a phase control voltage.

Figure 4A:
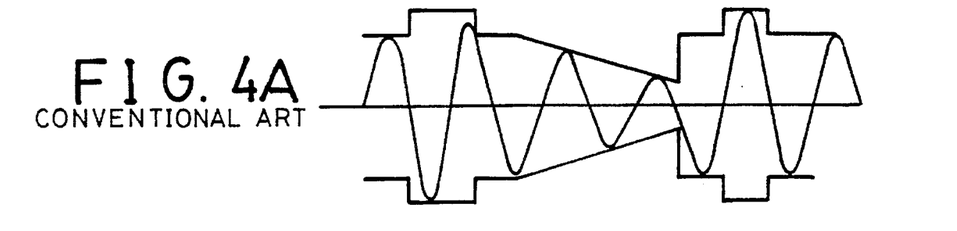
FIGS. 4A through 4G are wave forms of an input/output at each element of FIG. 2.
Figure 4B:
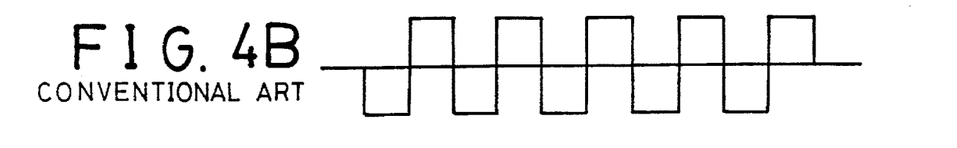
Figure 4C:
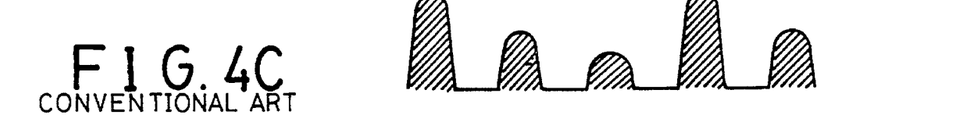
Figure 4D:
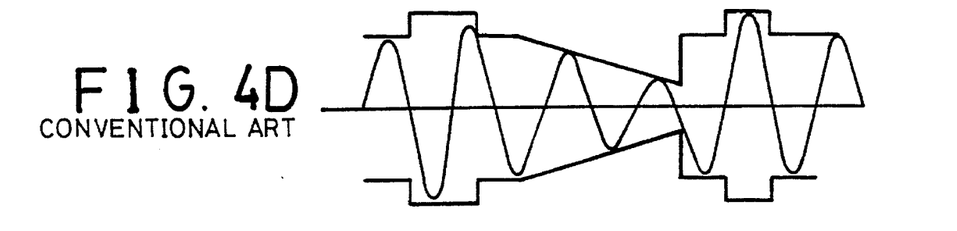

Thereafter, the transistors Q3 and Q6 of the differential amplifier 331 receive and differentially amplifies the picture intermediate frequency signal outputted from the picture intermediate frequency amplifier 2 through their base terminals and outputs the thusly differentially amplified signal, as shown in FIG. 4A, through the output line OL3 and outputs the signal, as shown in FIG. 4D, through the output line OL6.

Figure 4E:
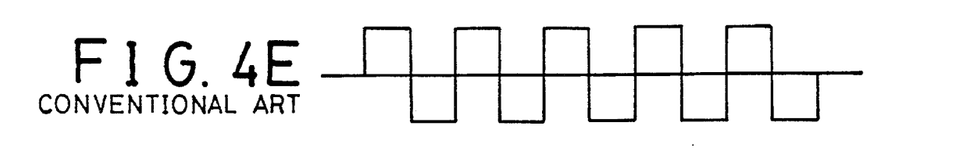

The transistors Q1 and Q2 of the first switch 332 receive a switching signal, as shown in FIGS. 4B and 4E, outputted from the voltage control oscillator 32 through their base terminals and receives the signal outputted through the output line OL3 of the differential amplifier 331 through their emitters. Since the collector terminal of the transistor Q1, switched in accordance with a switching signal, has a certain current voltage as shown in FIG. 4C, the signal is outputted through the output line OL1. In addition, since the collector terminal of the transistor Q2 has an inverted current voltage (not shown) with respect to the current voltage as shown in FIG. 4C, the signal is outputted through the output line OL2.

Figure 4F:
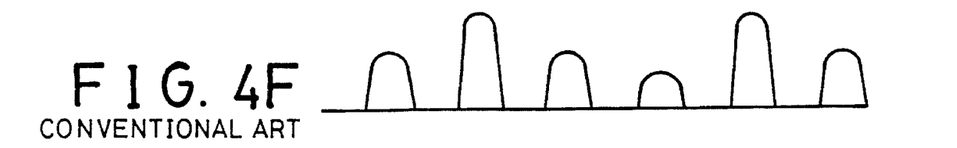

In addition, the transistors Q4 and Q5 of the second switch 333 receive a switching signal as shown in FIGS. 4B and 4E through their base terminals and are switched in accordance with a switching signal, and the collector terminal of the transistor Q5 has a current voltage as shown in FIG. 4F and the current voltage is outputted through the output line OL5, and the collector terminal of the transistor Q4 has an inverted current voltage as shown in FIG. 4F and the inverted current voltage is outputted through the output line OL4.

Figure 4G:
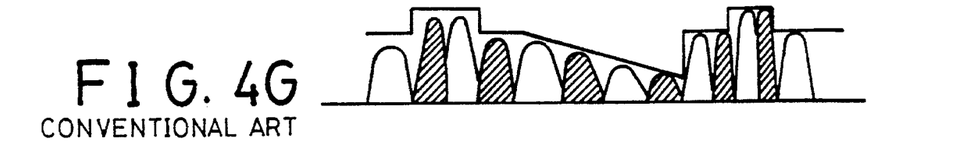

Therefore, the resistance of the signal adder 334 has a current outputted from the output line OL1 of the first switch 332 and the output line OL5 of the second switch, and the node N1 has a combined picture signal of a positive signal as shown in FIG. 4G, and the resistance R2 has a current outputted from the output line OL2 of the first switch 332 and the output line OL4 of the second switch 333, and the node N2 has a combined picture signal (not shown) of a negative combined picture signal which the positive combined picture signal is inverted as shown in FIG. 4G.

The combined picture signals of the nodes N1 and N2 of the signal adder 334 are amplified to a predetermined level.

The AGC circuit 5 detects an AGC voltage using a synchronous signal of combined picture signals applied thereto.

In more detail, the noise removing unit 51 of the AGC circuit 5 removes noise contained in the synchronous signal of the combined picture signals outputted from the picture amplifier 4.

Figure 5A:
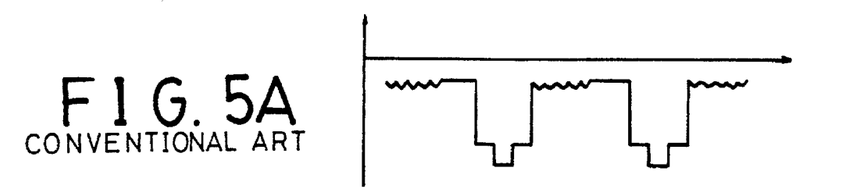
FIGS. 5A through 5D are wave forms of an input/output signal at each element of FIG. 3.
Figure 5B:
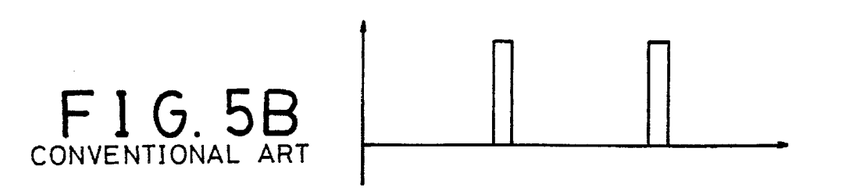

Since the transistor of the AGC voltage wave detector 52 is switched to the base terminal of the transistor Q2 in accordance with a synchronous signal of combined picture signals outputted from the noise removing unit 521 as shown in FIG. 5A, the previously voltage $B^+$ of the condenser C3 of the charging/discharging unit 521 is applied to the collector terminal of the transistor Q2, and the node N1 has a certain voltage as shown in FIG. 5B.

Figure 5C:
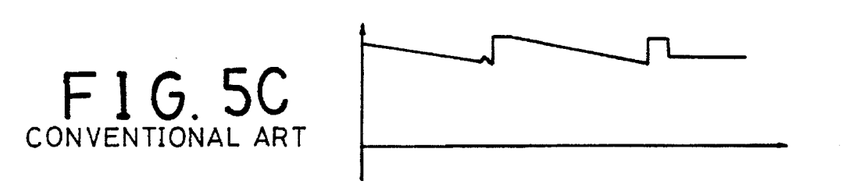

Thereafter, the voltage, as shown in FIG. 5C, applied to the node N1 is charged/discharged in the condenser C2 of the charging/discharging unit 522.

Figure 5D:
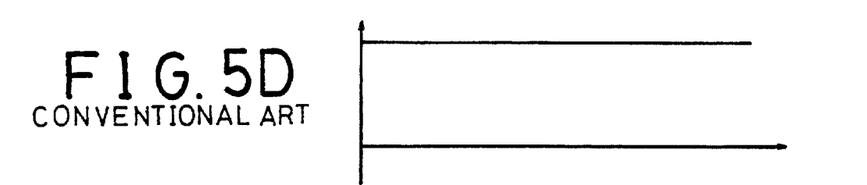

The transistor Q1 of the AGC voltage amplifier 53 amplifies the voltage of the node N2, and the thusly amplified voltage is smoothed by the condenser C1, and an AGC voltage as shown in FIG. 5D is outputted therefrom.

Meanwhile, the analog/digital signal convertor 6 converts the combined picture signal outputted from the synchronous wave detector 33 and separates horizontal/vertical synchronous signals from the combined picture signal outputted from the synchronous wave detector 33.

Thereafter, the timing signal generator 8 outputs a timing signal in accordance with horizontal and vertical synchronous signals outputted from the synchronous separator 7, and the GCR memory 9 stores a certain signal which is not within a ghost canceler reference range of the combined picture signals outputted from the analog/digital signal convertor 6.

The central processing unit 10 extracts a GCR data previously stored in the GCR memory 9 in accordance with a timing signal outputted from the timing signal generator 8, compares the thusly extracted data with an internal reference GCR data, and outputs a filter coefficient corresponding to a result.

Therefore, the digital filter 11 filters the combined picture signal outputted from the analog/digital signal convertor 6 in accordance with a filter coefficient outputted from the central processing unit 10, and removes ghost signal contained in the combined picture signal. The thusly removed combined picture signal is converted into an analog signal by the digital/analog signal convertor 12 and outputted to the synchronous circuit (not shown) through the picture amplifier 4.

Figure 6A:
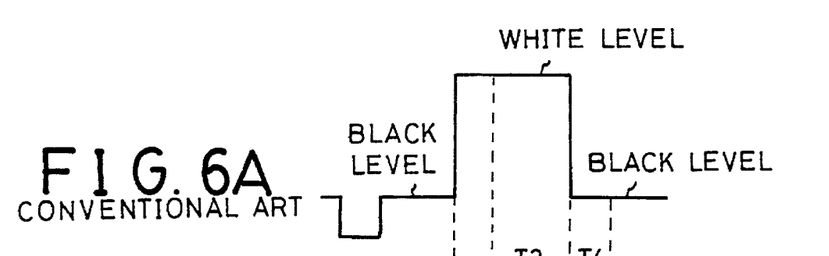
FIGS. 6A through 6B are a desired wave form and a ghost wave form combined by and inputted from a picture wave detector of FIG. 1.
Figure 6B:
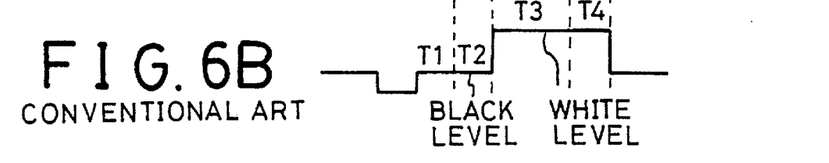
Figure 7:
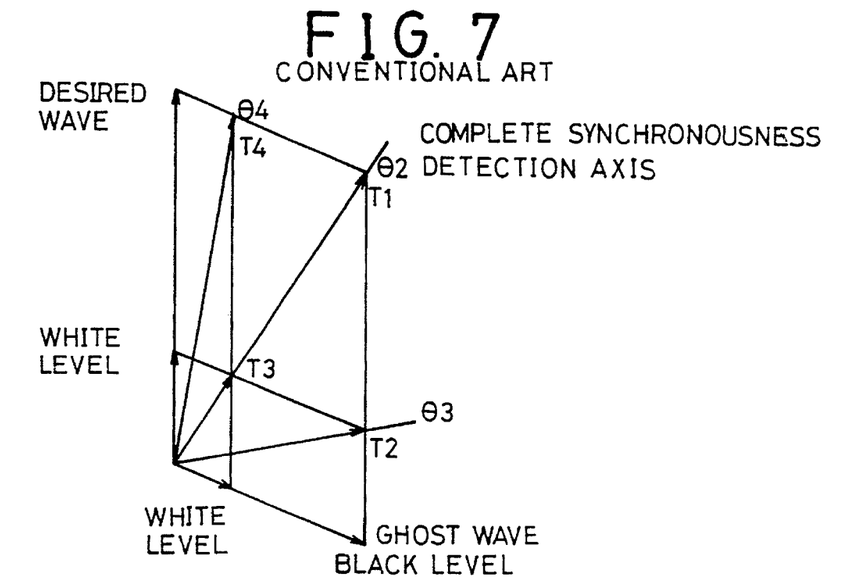
FIG. 7 is a view so as to vector values with respect to a phase variation when combining the wave forms of FIG. 6A and FIG. 6B.
Figure 8A:
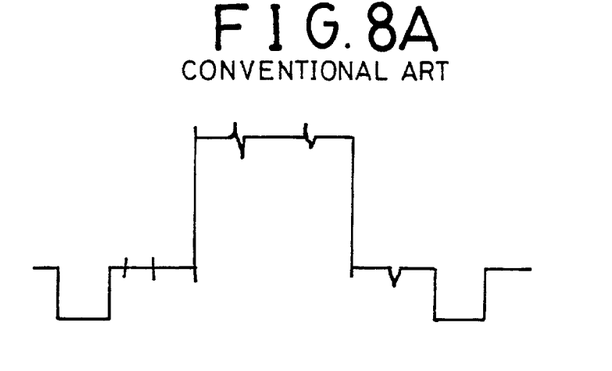
FIG. 8A is a wave form obtained during a wave detection in an ideal synchronous wave detection method of combining the wave forms of FIG. 6A and FIG. 6B.
Figure 8B:
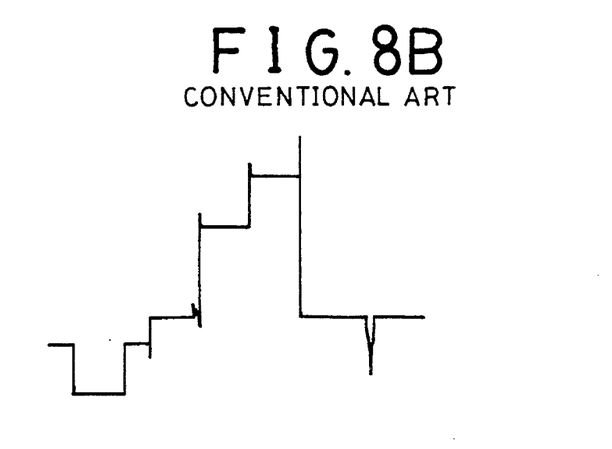
FIG. 8B is a wave form obtained during a wave detection in a real synchronous wave detection method of combining the wave forms of FIG. 6A and FIG. 6B.

However, the conventional ghost prevention apparatus for a television has disadvantages in that in case that a combined wave having a certain oscillating width smaller than that of an original combined picture signal (hereinafter called an "desired wave") as shown in FIG. 6A and delayed by a predetermined time is inputted into the automatic phase controller, and when in the combined wave, the black level or the white level match with the black level or the white level of the desired wave, that is, when a phase varies by θ2 due to the delay for predetermined time T1 and T3 as shown in FIG. 6B, and when the black level or the white level of the combined wave do not match with the black level or the white level of the desired wave, respectively, the phases θ3 and θ4 which vary due to the delay time T2 and T4 can be shown in FIG. 7. In addition, when detecting those combined waves in an ideal synchronous wave detection method, that is, when detecting a certain wave with a fixed phase of θ2 by setting a response time to "0", a certain wave detection signal as shown in FIG. 8A can be detected; however, when detecting a certain wave in a common synchronous wave detection method, since the phase of the carrier wave of a desired wave varies in accordance with a phase variation of the combined wave, when the level differences between the black level and the white level, as shown in FIG. 8B, are big, the level varies sharply, so that there exists ghosts at the side the white level after removing ghost, the ghost removing performance is disadvantageously decreased.

Figure 9A:
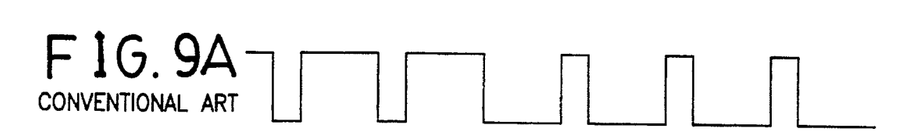
FIGS. 9A through 9F are wave forms of an input/output signal at each element of FIG. 1.
Figure 9B:
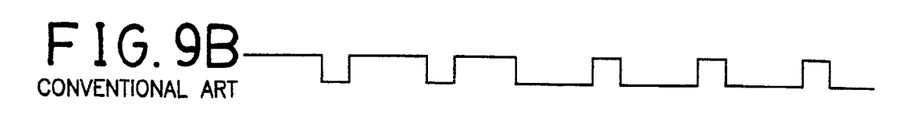
Figure 9C:
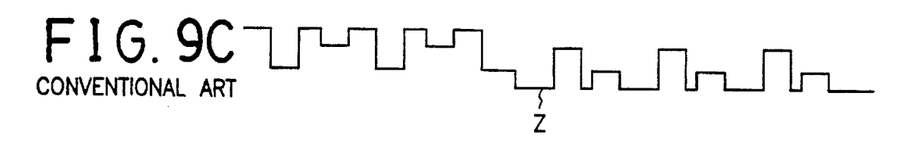
Figure 9D:
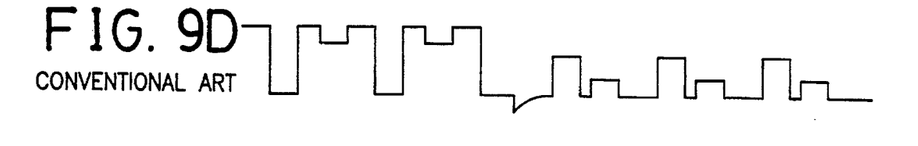
Figure 9E:
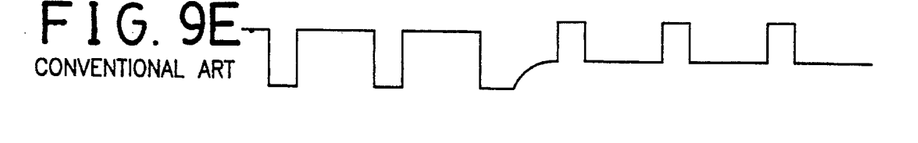
Figure 9F:
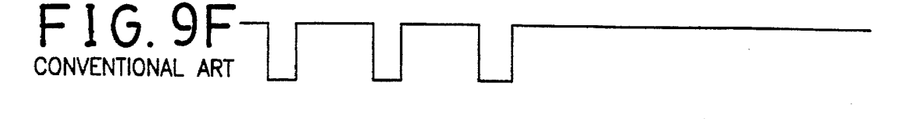

In addition, when the combined wave of FIG. 9C, which is obtained by combining the desired wave of FIG. 9A and the ghost wave of FIG. 9B, is applied to the AGC circuit through a picture wave detector and a picture amplifier in order, since the AGC circuit detects the wave of the AGC voltage of the combined waves applied thereto in a peak wave type AGC voltage wave detection method, when ghost is contained in the desired wave in a vertical synchronous range, a distortion of the AGC voltage when detecting the AGC voltage wave at Z-region as shown in FIG. 9C. In addition, since a picture signal as shown in FIG. 9E is applied to the synchronous separation circuit as shown in FIG. 9E when removing the ghost from the picture signal, the vertical synchronous signal is disadvantageously not separated in the vertical synchronous range.

SUMMARY OF THE INVENTION

Accordingly, it is an object of the present invention to provide a ghost prevention apparatus for a television, which overcome the problems encountered in a conventional ghost prevention apparatus for a television.

It is another object of the present invention to provide an improved ghost prevention apparatus for a television capable of preventing ghost of a picture of a television, which occurs due to a detection wave distortion, by generating a key pulse within a part of a horizontal synchronous section of a timing signal generator, by turning on an automatic phase controller for the key pulse generation section and turning off the same for the remaining horizontal synchronous section.

To achieve the above objects, there is provided a ghost prevention apparatus for a television, which includes a synchronous separator for separating horizontal and vertical synchronous signals, respectively, from a combined picture signal detected by a picture wave detector; a timing signal generator for generating a key pulse in a horizontal synchronous range in accordance with a horizontal synchronous signal outputted from the synchronous separator and for generating a vertical blanking signal in a vertical synchronous range in accordance with a vertical synchronous signal; a first sampling holder for sample-holding a phase control signal outputted from the picture wave detector, outputting the thusly sample-holden phase control signal to the picture wave detector in accordance with a key pulse outputted from the timing signal generator, and enabling the picture wave detector; and a second sampling holder for sample-holding an AGC wave detection signal outputted from an AGC circuit, disabling the AGC circuit in accordance with a vertical blanking signal outputted from the timing signal generator.

DETAILED DESCRIPTION OF THE INVENTION

Figure 10:
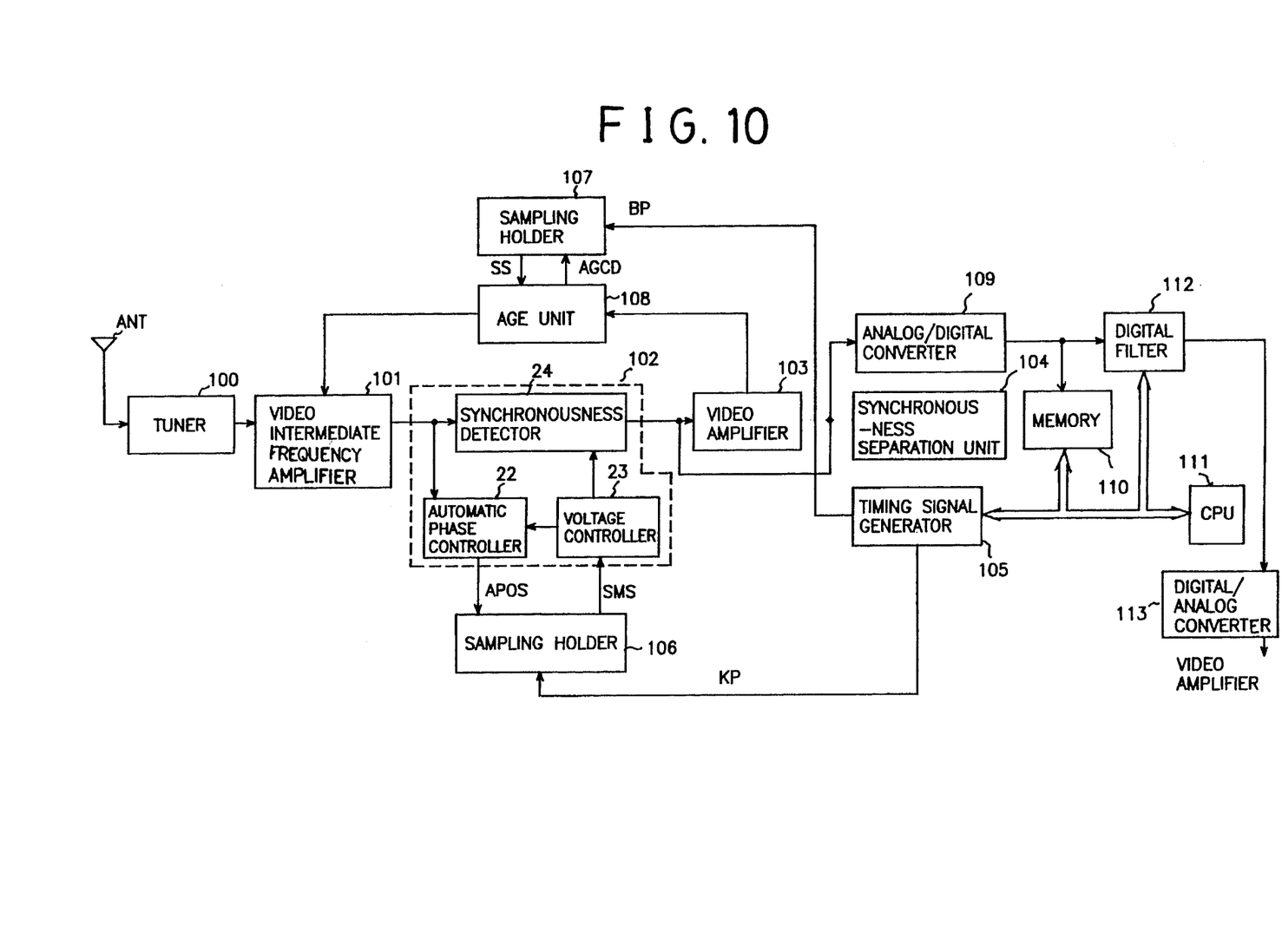
FIG. 10 is a block diagram of a ghost prevention apparatus for a television according to the present invention.

Referring to FIG. 10, the ghost prevention apparatus for a television according to the present invention includes a tuner 100 for receiving broadcasting signal transmitted from a broadcasting station through an antenna and for outputting a picture intermediate frequency signal, a picture intermediate frequency amplifier 101 for amplifying a picture intermediate frequency signal outputted from the tuner to a predetermined level, a picture wave detector 102 enabled in accordance with a sampling signal applied thereto for detecting a combined picture signal of the picture intermediate frequency signal outputted from the picture intermediate frequency amplifier 101, a picture amplifier 103 for amplifying the combined picture signal outputted from the picture wave detector 102 to a predetermined level, a synchronous separator 104 for separating horizontal and vertical synchronous signals from a combined picture signal outputted from the picture wave detector 102, a timing signal generator 105 for generating a key pulse KP in a horizontal synchronous range and a blanking pulse BP in a vertical synchronous range in accordance with horizontal and vertical synchronous signals outputted from the synchronous separator 104, a sampling holder 106 for sampling the automatic phase control signal APCS outputted from the picture wave detector 102 and for holding for a predetermined time, and for outputting the signal SMS sampled in accordance with a key pulse KP outputted from the timing signal generator 105, a sampling holder 107 for sampling and holding the AGC wave detection voltage and for holding the sampling signal holden by the vertical blanking signal BP outputted from the timing signal generator 105, an AGC circuit 108 disabled in accordance with a signal HS outputted from the sampling holder 107, a memory 110 for storing the GCR data of the digital signal outputted from the analog/digital signal convertor 109, a central processing unit 111 for extracting a GCR data stored in the memory 110 and for comparing the thusly extracted data with a reference GCR data and for outputting a filter coefficient in accordance with a result of the comparison, a digital filter 112 for removing the ghost component from the digital signal outputted from the analog/digital signal convertor 109 in accordance with a filter coefficient outputted from the central processing unit 111, and a digital/analog signal convertor 113 for converting the digital signal outputted from the digital filter 112 into an analog signal.

The picture wave detector 102 includes a phase controller 22 for comparing a phase of the picture intermediate frequency signal outputted from the picture intermediate frequency amplifier 101 with a phase of the voltage control oscillating signal transmitted thereto and for outputing an automatic phase control signal APCS in accordance with a result of the comparison, a voltage control oscillator 23 oscillated in accordance with a sampling signal SMS outputted from the sampling holder 106 for outputting an oscillating signal, and synchronous wave detector 24 for synchronous-detecting the picture intermediate frequency signal outputted from the picture intermediate frequency amplifier 101 in accordance with an oscillating signal outputted from the voltage control oscillator 23.

The operation of the ghost prevention apparatus for a television according to the present invention will now be explained with reference to FIG. 11.

To begin with, when the tuner 100 receives a broadcasting signal transmitted from a broadcasting station through an antenna, the tuner 100 outputs an intermediate frequency signal, and thusly outputted intermediate frequency signal is amplified by the picture intermediate frequency amplifier 101 to a predetermined level.

Thereafter, the picture wave detector 102 receives and compares a picture intermediate frequency signal outputted from the picture amplifying frequency amplifier 101 and an oscillating signal oscillated by the voltage control oscillator 23, and outputs a phase control signal APCS so that the phase of the picture intermediate frequency signal matches with the phase of the oscillating signal.

The sampling holder 106 samples and holds the phase control signal outputted from the automatic phase controller 22.

Thereafter, the sampling holder 106 applies a signal SMS sampled in accordance with a key pulse KP outputted from a timing signal generator 105 to the voltage control oscillator 23.

Therefore, the voltage control oscillator 23 is oscillated by the sampling signal SMS outputted from the sampling holder 23 and outputs an oscillating signal, and the picture intermediate frequency amplifier 101 detects a synchronous wave signal and outputs a combined picture signal in accordance with an oscillating signal.

In addition, the synchronous separator 104 separates horizontal and vertical synchronous signals from the combined picture signal outputted from the synchronous wave detector 24, and the timing signal generator 105 generates a timing signal in accordance with horizontal and vertical synchronous signals outputted from the synchronous separator 104, and a key pulse is generated in a range of a horizontal synchronous range in accordance with a horizontal synchronous signal, and a vertical blanking signal BP is generated in a vertical synchronous range in accordance with a vertical synchronous signal.

Since the sampling holder 106 executes a sampling in accordance with a key pulse outputted from the timing signal generator 105 and outputs the phase control signal APCS outputted from the phase controller 22 to the voltage controller 23, the operation of the phase controller 22 acts within a key pulse range, so that the response time of the phase controller 22 becomes delayed.

In addition, the picture amplifier 103 amplifies and outputs the combined picture signal outputted from the synchronous wave detector 24 to a predetermined level, and the AGC circuit 108 receives a combined picture signal outputted from the picture amplifier 103 and detects an AGC voltage wave from the combined picture signal, and outputs an AGC wave detection signal AGCD.

Thereafter, the sampling holder 107 receives an AGC wave detection signal outputted from the AGC circuit 108 and samples and holds the AGC wave detection signal and continuously holds the AGC wave detection signal in the vertical blanking signal range in accordance with a vertical blanking signal BP outputted from the timing signal generator 105.

The AGC circuit 108 is disabled in the vertical blanking signal range, that is, the vertical synchronous range.

Meanwhile, since the operation that ghost is removed from the combined picture signal outputted from the synchronous wave detector 24 is previously explained, the same will be omitted.

As described above, the ghost prevention apparatus for a television according to the present invention is directed to delaying a response time of the phase controller by executing the phase control operation in a horizontal synchronous range when detecting a picture wave and by removing the remaining ghost due to the wave detection distortion, thus enhancing ghost removing performance compared with the prior art.

Figure 11A:
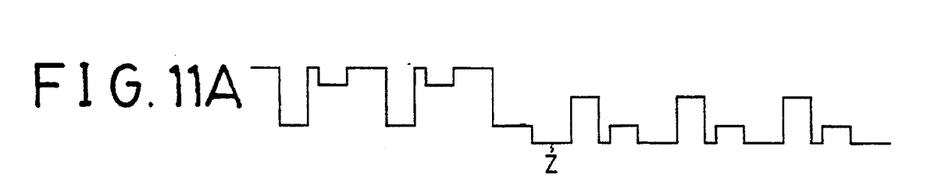
FIGS. 11A through 11D are wave forms of an input/output signal at each element of FIG. 10 according to the present invention.
Figure 11B:
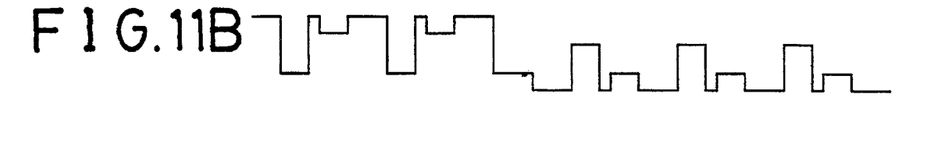
Figure 11C:
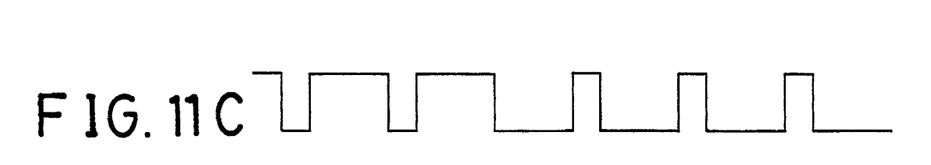
Figure 11D:
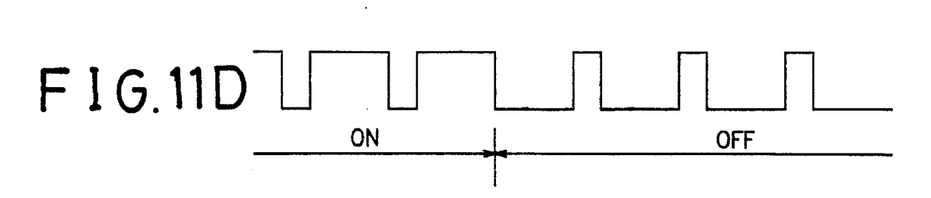

In addition, when the combined wave as shown in FIG. 11A is applied to the AGC circuit in order through the picture wave detector and the picture amplifier, the AGC circuit detects the AGC voltage wave from the combined signal wave. When the ghost wave contained in the desired wave in the vertical synchronous range exceeds a predetermined level, a picture signal in which any distortion is not contained as shown in FIG. 11B is outputted from the picture wave detector by turning off the AGC circuit in Z-region of FIG. 11A. When ghost is removed from the picture signal, since a certain picture signal as shown in FIG. 11C is applied to the synchronous separator, the vertical synchronous signal is more correctly separated from the vertical synchronous range, thus enhancing the resolution of a television.

What is claimed is:

1. A ghost prevention apparatus for a television, comprising:

synchronous separation means for separating horizontal and vertical synchronous signals, respectively, from a combined picture signal detected by picture wave detection means;

timing signal generating means for generating a key pulse in a horizontal synchronous range in accordance with a horizontal synchronous signal outputted from said synchronous separation means and for generating a vertical blanking signal in a vertical synchronous range in accordance with a vertical synchronous signal;

first sampling holder means for sample-holding a phase control signal outputted from said picture wave detection means, outputting the thusly sample-holden phase control signal to the picture wave detection means in accordance with a key pulse outputted from said timing signal generating means, and enabling the picture wave detection means; and second sampling holder means for sample-holding an AGC wave detection signal outputted from an AGC circuit, disabling said AGC circuit in accordance with a vertical blanking signal outputted from the timing signal generation means.

* * * * *